May 19, 1936.   O. BARNACK   2,041,632
CINEMATOGRAPHIC AND PHOTOGRAPHIC CAMERA
Filed Jan. 6, 1932
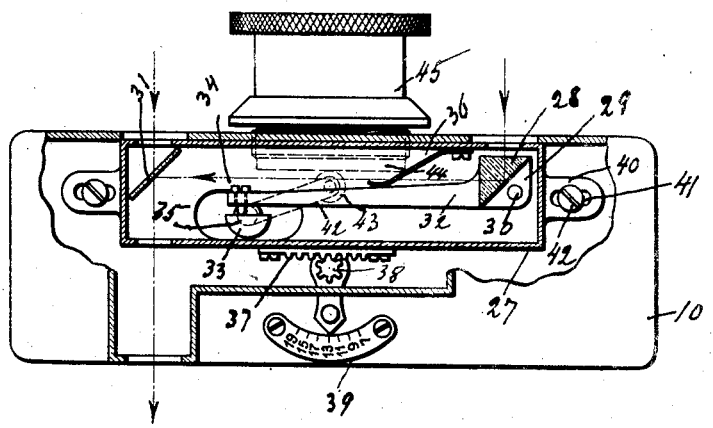
INVENTOR
Oskar Barnack
BY
ATTORNEY Patented May 19, 1936

2,041,632

UNITED STATES PATENT OFFICE 2,041,632

CINEMATOGRAPHIC AND PHOTOGRAPHIC CAMERA

Oskar Barnack, Wetzlar, Germany, assignor to Ernst Leitz Optische Werke, Wetzlar, Germany Application January 6, 1932, Serial No. 584,969
In Germany January 7, 1931

2 Claims. (Cl. 95—44)

This invention relates to improvements in photographic and cinematographic cameras in which a mirror distancing gage is coupled with the adjusting device for the objective. In cameras in which the mirror distancing gage is coupled with the adjusting device for the objective of the known type it is not possible to use the same distancing gage with a change in objective, or it was necessary to use special meter scales on the gage which, however, frequently were the cause of errors and which made the camera comparatively expensive.

It is the object of my invention to overcome this disadvantage by providing a connection between objective adjustment and distancing gage consisting of arranging a prism within a housing in which also the mirror is arranged and connected by means of a system of levers with the objective adjustment.

Another object of my invention is also the provision of a connection between objective adjustment and distancing gage which is adapted to be adjusted to allow the use of exchangeable objectives with one and the same distancing gage.

These and other objects and advantages of my invention will become more fully known as the description thereof proceeds and will then be specifically defined in the appended claims.

In the accompanying drawing forming a material part of this disclosure:

The single figure shows a sectional elevation of a device for adjusting the objective frame commensurate to the adjustment of a mirror distance gage constructed according to my invention.

As shown, the brackets 40 on the housing of the distance meter are provided with elongated slots 41 through which the fastening screws 42 extend so that a displacement of housing 27 is possible by unscrewing screws 42, shifting the housing and tightening the screws again. The spindle 35 extends through an opening indicated by numeral 43 and in dotted lines.

The movable prism 28 is arranged within the distancing gage, on a seat or chair 29, turnable about a shaft 30, by means of lever 32 and the housing contains also a stationary mirror 31 and the elements coupling the objective adjustment with the distance gage, which will be hereinafter more fully described.

A spring 36 secured at one end to the housing of the distance gage and engaging lever 32 has the tendency to press lever 32 down, and the distancing gage is adjustably arranged on the rack bar 37 in mesh with gear 38.

In the housing for the distance gage 27 the spindle 35 carries an arm 42 provided at its other end with a roller 43 held in engagement with the adjusting member 44 for the objective holder 45 of well known construction, so as to allow a rocking of the mirror 28 at a velocity equal to the focal length of each lens.

The operation of my device will be entirely clear from the above description and by reference to the drawing, and it will be clear that while the housing of the distance gage must be adjusted by means of the set screws 11, 12 to suit the focus of a new objective if the same is changed as indicated by the proper adjustment of hand 16 on scale 39, while this is done parts 32' and 33 will remain unchanged in their positions while the operating point 34 of the lever for the movable prism will be moved on cam 33.

It will be understood that I have disclosed the preferred form of my invention only as an example of the many possible ways to practically construct my device and that I may make such changes in its general arrangement and the construction of its minor details as come within the scope of the appended claims without departure from the spirit of my invention and the principles involved.

Having thus described my invention what I claim as new, and desire to secure by Letters Patent is:

1. In a photographic camera including its objective frame, having a displaceable range finder, with two mirrors, one fixed and the other movable, a lever controlling the movable mirror, a spindle connected to the objective frame, a rack bar carrying the range finder, a cam disc for supporting said lever at various points during the displacement of said range finder, a spring for pressing the lever down, a scale and its hand, a gear on said hand in mesh with said rack, the change in the leverage controlling the indications of said hand to indicate on one scale the focal distances of the various objectives used.

2. In a photographic camera including its objective setting, a displaceable range finder with two mirrors, one fixed and the other movable, a lever controlling the movable mirror, a spindle connected to the objective setting, a disc on said spindle having a tooth, a cam adapted to be engaged by said tooth and supporting said lever at various points during the displacement of said range finder, a rack bar carrying said finder, a spring for engaging said lever, a scale and its hand, a gear on said hand in mesh with said rack bar, the change in the leverage controlling the indications of said hand to indicate on said scale the focal distances of the various objectives used in their setting.

OSKAR BARNACK.